(No Model.)
J. L. JONES.
MEANS FOR CONNECTING FOOT PIECES TO CULTIVATOR STANDARDS.
No. 548,207. Patented Oct. 22, 1895.
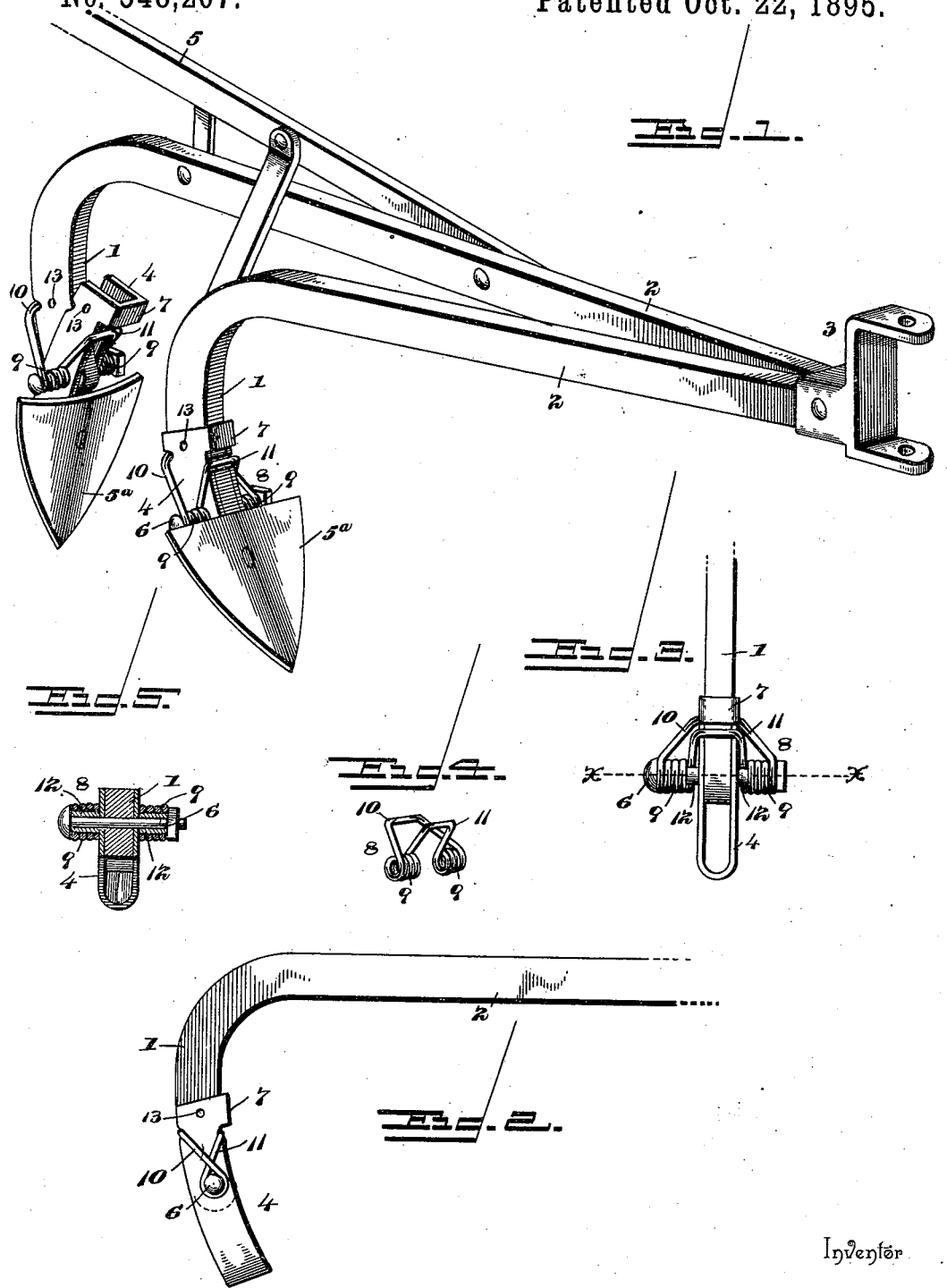
Witnesses
E. K. Stewart
V. B. Hillyard
Inventor
John L. Jones
By his Attorneys,
C. A. Snow & Co.

UNITED STATES PATENT OFFICE.

JOHN L. JONES, OF RICHLAND, IOWA.

MEANS FOR CONNECTING FOOT-PIECES TO CULTIVATOR-STANDARDS.

SPECIFICATION forming part of Letters Patent No. 548,207, dated October 22, 1895.

Application filed May 8, 1895. Serial No. 548,590. (No model.)

*To all whom it may concern:*

Be it known that I, JOHN L. JONES, a citizen of the United States, residing at Richland, in the county of Keokuk and State of Iowa, have invented a new and useful Means for Connecting Foot-Pieces to Cultivator-Standards, of which the following is a specification.

In the use of cultivators and similar agricultural implements for tilling the soil it is a matter of common experience to have the shovels and standards become broken by engagement of the shovel with roots, stones, and other unyielding objects, and to prevent injury to the implement break-pins have been generally employed, and sometimes springs, to admit of the shovel passing the unyielding obstruction without resulting in breakage or serious damage to the implement or its working parts. The chief objection against the use of break-pins is that the implement is disabled and considerable time is consumed in removing the broken parts of the pin and the replacement of the same by a new pin. Where springs have been employed, the best results obtainable are not secured, either because of the relative disposition of the said springs or the construction, which is not best adapted for the purpose.

The present invention aims to obviate the objections existing against the provisions usually employed to effect the result, which is attained by the present improvement in a simple and efficient manner.

For a full understanding of the invention and the advantages resultant therefrom reference is to be had to the subjoined description, taken in connection with the drawings hereto attached, in which—

Figure 1 is a perspective view of a plow or cultivator, showing the application of the invention. Fig. 2 is a side elevation of the rear portion of a plow-beam, showing the application of the invention, the shovel being removed. Fig. 3 is a front elevation of the standard, showing the invention in position. Fig. 4 is a detail perspective view of the spring by means of which the foot has yielding connection with the standard. Fig. 5 is a cross-section on the line X X of Fig. 3.

Similar reference-numerals indicate corresponding parts in the various views.

It will be understood that the invention is to be applied to any style or make of cultivator or plow and without requiring any special construction thereof in adapting and applying the attachment thereto.

The cultivator illustrated in Fig. 1 is of ordinary construction and is shown equipped with the attachment, and the same comprises beams 2, connected at their front ends and provided with a clevis 3, by means of which attachment of the team is had with the implement or the latter with a sulky, and the rear end portions of the said beams curve downwardly and forwardly to provide standards 1, which are supplied with feet 4, of any approved design, having pivotal connection with the standards in any desired manner. The handle 5 is secured to one of the beams and is strengthened and stayed by means of braces which extend from the beams 2 in an inclined direction and are made fast at their upper ends to the handle 5. Inasmuch as the invention will be applied to the standards 1 in a similar manner a detailed description of one will suffice. The foot 4, to which the shovel 5ª, of any preferred construction, is attached, is secured to the lower end of the standard 1 by a pivot or bolt 6 in the usual way. The foot projects vertically above the pivot 6 and has a cross-piece 7 at its upper end, which engages with the front portion of the standard to form a stop, which limits the rear movement of the upper end of the said foot. This cross-piece 7 is not essential, as the rear portion of the spring will, in practice, answer the same purpose, as will be readily understood.

The spring connection 8 is formed from a single length of wire, which is doubled or folded upon itself, and is bent to form opposite side coils 9, and loop-shaped arms 10 and 11, which cross and engage, respectively, with the front and the rear edges of the foot and standard. The meeting ends of the wire forming the spring connection are interlocked or secured tegether in any convenient manner. The side coils 9 are mounted upon the projecting ends of the pivot or bolt 6 and occur one on each side of the standard. To prevent undue wear between the coils and the pivot or bolt 6, short tubes 12 are mounted upon the projecting end portions of the said pivot or bolt, and upon these tubes 12 are mounted the coils 9. The tubes 12 will be held in place upon the ends of the pivot or bolt 6 by upsetting the ends of the latter, as commonly practiced in the art of riveting, or if the said pivot is a bolt the tubes will be confined between the head of the bolt and its clamping-nut. The latter construction is preferred, as it admits of the parts being readily accessible for any required purpose.

The operation of the invention will be readily understood from the foregoing description. However, it may be well to state that the spring connection is so disposed relatively to the foot and standard so that when the shovel strikes a root, stone, or like obstruction it will yield and ride past and over the same, and when the obstruction is cleared the foot will automatically return into an operative position without any care or attention on the part of the operator.

The invention is designed to be applied to any style of iron or steel plow or cultivator beam and can be readily fitted to that class of implements constructed to be used in connection with break-pins, as all that is necessary to adjust and place the same in position is to remove the pivot between the foot and the standard and replace it by a longer pivot and provide short tubes for the projecting ends of the said pivot, as will be readily comprehended. It is preferred to provide registering openings 13 in the foot and standard for the reception of a common break-pin, so that in an emergency, as in the event of the spring becoming broken or otherwise disabled, a break-pin can be inserted into the openings 13, thereby providing for the continuous use of the implement.

It is manifest that the spring connection is susceptible of a variety of uses and applicacations and can be employed wherever it is required to connect parts in a yielding manner, either for draft or other purposes. Therefore in adapting the same to meet the required need it must be understood that various changes in the form, proportion, and the minor details of construction may be resorted to without departing from the principle or sacrificing any of the advantages of this invention.

Having thus described the invention, what is claimed as new is—

1. The combination with a standard, and a foot pivotally connected therewith, of a spring formed of a single length of wire bent to provide oppositely-disposed side coils, and loop-shaped arms which cross and engage, respectively, with the foot and standard at opposite or transversely aligning points, the side coils being mounted substantially in line with the pivotal connection between the said foot and standard, substantially as specified.

2. The combination with a standard, and a foot pivoted thereto, the ends of the pivot being extended, of a spring connection formed of a single length of wire bent to provide side coils which are mounted upon the projecting ends of the pivot, and arms which cross and engage, respectively, with the foot and standard, substantially as set forth.

3. In combination, a standard, a foot having pivotal connection therewith, the ends of the pivot projecting, short tubes mounted upon the projecting ends of the pivot, and a spring connection comprising side coils which are mounted upon the said tubes and have crossing arms to engage with the foot and standard, substantially as set forth.

In testimony that I claim the foregoing as my own I have hereto affixed my signature in the presence of witnesses.

JOHN L. JONES.

Witnesses:
H. MORGAN JONES,
RICHARD JONES.
R. H. WALKER.